June 23, 1936.  A. G. McNICOLL  2,045,041
MECHANICAL CONTROL
Filed July 20, 1931  3 Sheets-Sheet 1
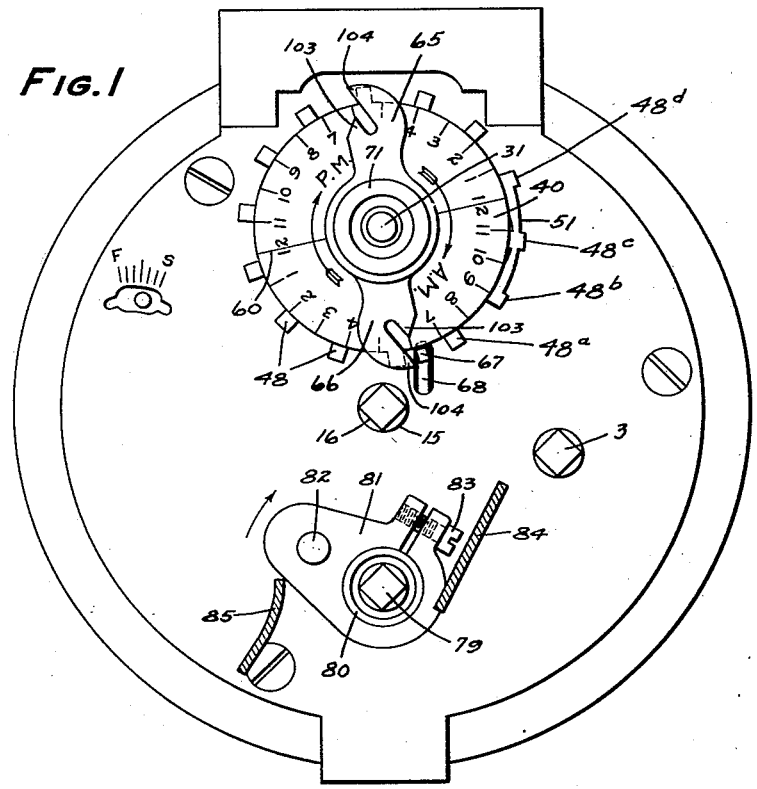
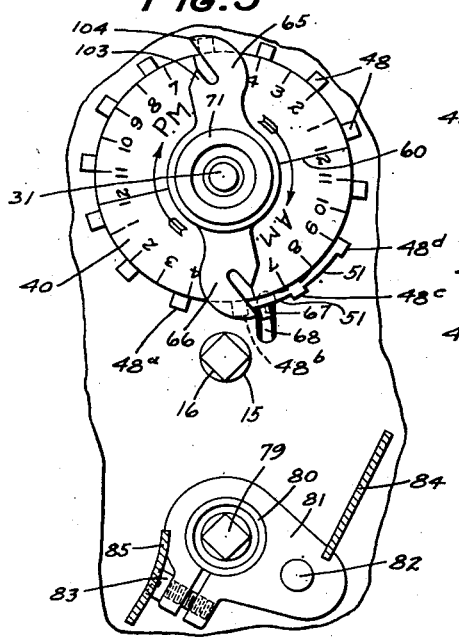
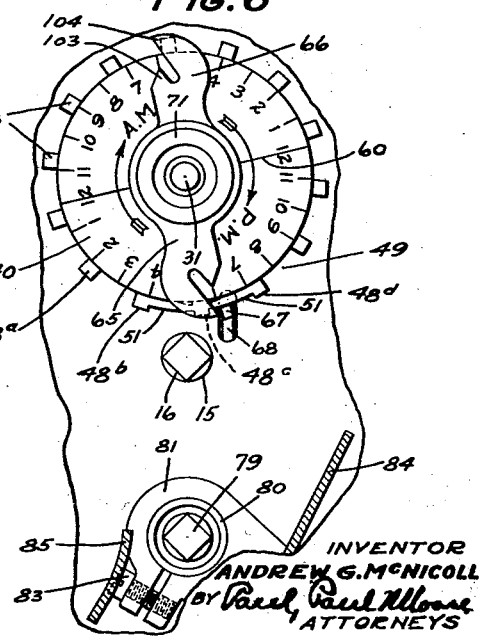
INVENTOR
ANDREW G. McNICOLL
BY
ATTORNEYS June 23, 1936.  A. G. McNICOLL  2,045,041
MECHANICAL CONTROL
Filed July 20, 1931  3 Sheets-Sheet 2
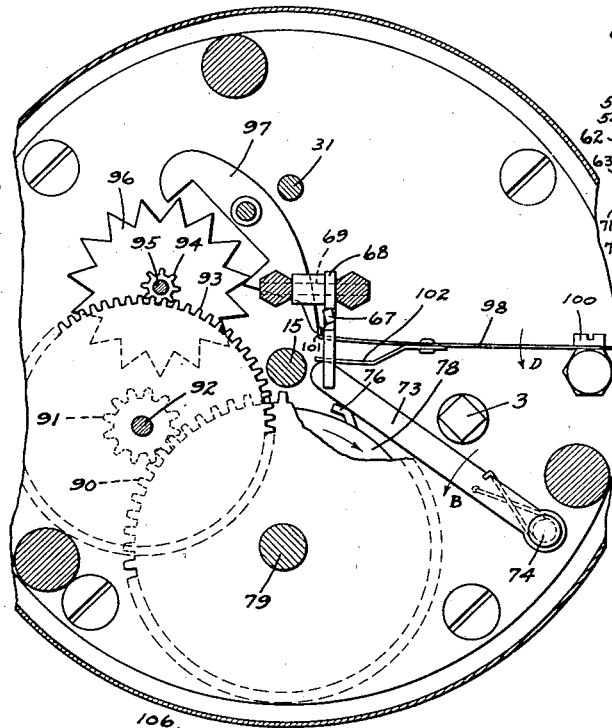
INVENTOR
ANDREW G. McNICOLL
ATTORNEYS June 23, 1936.  A. G. McNICOLL  2,045,041
MECHANICAL CONTROL
Filed July 20, 1931  3 Sheets-Sheet 3

INVENTOR
ANDREW G. McNICOLL
BY
ATTORNEYS

Patented June 23, 1936

2,045,041

UNITED STATES PATENT OFFICE 2,045,041

MECHANICAL CONTROL

Andrew G. McNicoll, Minneapolis, Minn., assignor to Minneapolis-Honeywell Regulator Company, Minneapolis, Minn., a corporation of Delaware Application July 20, 1931, Serial No. 551,982

20 Claims. (Cl. 161—1)

This invention relates generally to the provision of means adapted for automatically operating a mechanism in a predetermined cyclic manner and further adapted for automatically interrupting the action of said first means for a predetermined portion of the cycle, and finds valuable application for automatically alternately changing "the setting" of a room thermostat, which controls a heating plant.

In certain types of heating-plant controlling thermostats, means is provided for adjustably spacing the switch contacts so that either a greater or lesser temperature drop will be required to cause contact closure. It is desirable, at night and during extended absences of the occupants, to so adjust (more widely space) the contacts as to require a greater temperature drop to cause closure. It is also desirable to provide means which automatically adjust the contacts, morning and evening, to respectively obtain lesser and greater contact spacing. Moreover, it is desirable, in case of prolonged absence of the occupants, to provide means whereby the setting for closure only at lower temperature can be maintained for a day or more, and whereby the cycle of alternate morning and evening settings can afterwards be caused to be automatically resumed.

For these purposes, a mechanism is herein provided for operating the thermostatic adjustment means in a predetermined cyclic manner and means is also provided for interrupting the action for a predetermined portion of the cycle. The present device may also be applied for controlling any suitable mechanism in the manner referred to. There is, therefore, no intention to limit the invention entirely to the specific embodiment disclosed, as an example, although the specific embodiment and the details of construction thereof are included as features of the invention.

Features of the invention include a mechanism, and means for operating it in a predetermined cyclic manner, along with means for interrupting the action of said means during a predetermined portion of the cycle. A specific feature relates to a very simple and inexpensive device including a disc having spaced teeth adapted to control a suitable member to initiate operation of any suitable mechanism, by having the depth of the teeth normally such as to permit a return of the control member to an initial position at which it can perform its control function, and the provision of means for filling the spaces between some of the teeth to prevent return motion of the member to such initial position.

Objects, features and advantages of the invention will be set forth in the description of the drawings forming a part of this application, and in said drawings Figure 1 is a rear face view of a clock equipped with a mechanism which illustrates one embodiment of this invention;

Figure 2 is a side elevation of Figure 1 with the casing removed, and omitting most of the clock mechanism and showing certain of the parts in section;

Figure 3 is a vertical section taken substantially on line 3—3 of Figure 2 illustrating the driving and tripping control mechanisms;

Figure 4 is a detail further illustrating the tripping mechanism of Figure 3, and showing it in tripped condition;

Figures 5 and 6 are detail views respectively showing different positions of the mechanism;

Figure 7 is a fragmentary face view of a thermostat showing means for adjusting its contacts;

Figure 8:
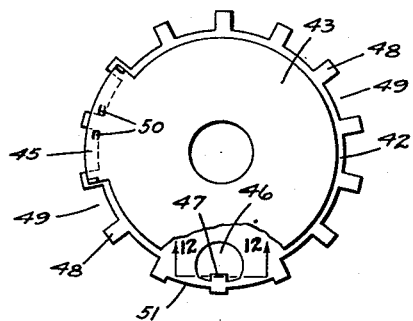
Figure 8 is a face view of the week-end shut-off disk, illustrating the use of the holiday disk in conjunction therewith.

First referring to Figure 2, the numeral 1 indicates one of the frame plates of a clock, and the numeral 2 another plate. Between these plates are arranged the clock gear train, and clock spring barrel, not shown, because all are well known in the art. The winding shaft for the main spring of the clock is indicated at 3, see Figure 3. Associated with this clock is a mechanism which is adapted for controlling the setting mechanism of a thermostat so as to alternately move the contacts closer to or farther from the corresponding thermally controlled elements. Between the plates 2 and 5 is arranged one means adapted to control this setting, and this means may be the ordinary alarm mechanism of the clock.

One part of the setting shaft for the hands of the clock is indicated at 10 and has a bearing in the plate 1. The clock dial has been omitted. This element 10 has a clutch element 12 cooperative with clutch element 13 of the other portion 15 of the setting shaft. The shaft 15 is journaled in plates 2 and 5 and projects at the rear and has a squared setting-key terminal 16. A spring 17 normally holds the clutches in disengaged position, and when it is desired to set the hands, the element 15 is translated and the clutch members 12 and 13 properly connected.

Figure 12:
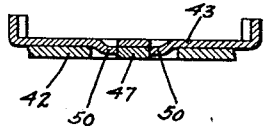
Figure 12 is a section showing the holiday disk associated with the week-end shut-off disk, but in inoperative position, the line of the section being indicated at 12—12 on Figure 8.

Upon the shaft 10 is journaled a gear cluster composed of gears 18—19. The hour hand 20 is integral with this cluster. The minute hand is indicated at 21 and is attached to the shaft 10. The shaft 10 is driven in the usual manner and includes in its gear train a gear 26 mounted on shaft 25 and a pinion 27 on shaft 10. A dial 40 is driven from the hour train, and this drive includes pinion 28 of shaft 25, gears 18 and 19 of the aforementioned cluster of shaft 10, and gear 30 of shaft 31. The shaft 31 is caused to make one complete revolution every twenty-four hours. Shaft 31 is journaled in plates 1, 2 and 5 and projects to receive the dial and associated parts including the "week-end shut-off disk" 42 of this invention. The shaft 31 is held against translation by collars 36 and 37. This shaft 31 is counter-turned at 38 to provide a shoulder 39. On this counter-turned portion 38 and against the shoulder 39 is placed resilient friction member 41. There is also placed on the reduced portion 38 the toothed "shut-off" disk 42 which is one of the principal features of this invention, and provides a very simple and inexpensive means adapted to control any suitabale mechanism in a predetermined cyclic manner and further adapted to modify the control action during any desired portion of the cycle. A second disk 43 is adapted under certain conditions to be placed on reduced portion 38 and against the disk 42, and this disk and its manner of attachment is best illustrated in detail in Figures 2, and 8 to 12. The disk 43 is provided with a segmental peripherally-projecting portion 45 which is cooperable to fill the spaces 49 between the teeth 48 of the disk 42, as shown in Figure 8. The disk 42 has an opening 46 having a marginal projection 47 which is radially aligned with one of the teeth 48. The filler segment 45 of the plate 43 is, in this instance, adapted to cover two tooth spaces, and is the equivalent of the filled-in portions 51 of disk 42. The circumferential extent of the filler projection 45 may be varied. This filler portion 45 can be placed as shown in Figure 8; or as in Figure 12 whereat it registers with the filled-in portion 51. To secure the disk 43 against accidental rotation and with its portion 45 in register with the portion 51, the filler portion 45 has a pair of punched-out lugs 50 which engage the tooth 47 of the disk 42 as best shown in Figure 12. By depressing the plate 42 against the action of the friction element 41, lugs 50 are disengaged from corresponding tooth 48, and 43 can be rotated to have the lugs 50 engage at opposite sides of any other tooth 48.

The shaft 31 is again counter-turned as at 53 to provide a shoulder 54 and this counter-turned portion is flattened on opposite sides as at 55. The dial 40 has a slot-like central opening which engages the counter-turned and flattened portions 53, 55 and shoulder 54. The slot-like central opening and flattened portions cooperate to non-rotatably secure the dial to the shaft. The elements 42 and 43 lie between the dial and the friction element 41. In this manner element 42 normally rotates with the dial 40 unless prevented by engagement of one of its teeth with a control element, hereinafter also called a trip lever, which is adapted, on return to a predetermined initial position after movement away from that position, to cause operation of the means which controls the adjustment of the thermostat calibrating or setting means.

The face of the dial 40 has twenty-four major divisions corresponding to the hours of the day. A diametric line 60 divides the dial into A. M. and P. M. areas.

The shaft 31 is again counter-turned as at 62 and this counter-turned portion is terminally threaded, and is flattened on one side as at 63. A shoulder 64 is formed by this counter-turning. The outer face of the dial 40 projects outwardly beyond the corresponding face of the shoulder 64. Upon the counter-turned portion 62 are rotatably arranged a pair of trip arms respectively indicated 65, 66. The function of these trip arms (see Figures 1 and 2) is to engage the projecting end 67 of a trip lever 68, suitably pivoted as at 69 to plate 5. A washer 70 and a thumb nut 71 constitute means for clamping the trip arms against the dial after adjustment relative to the dial divisions. A single arm may be used. The washer has a flat portion cooperating with the flattened prtion 63 to prevent its rotation.

The trip lever 68 has a portion 72, the end of which laterally engages an arm 73 pivoted as at 74 and adapted to be moved by the trip lever laterally in direction of arrow A (see Figure 2) against the action of spring 75, which spring also acts to urge the arm in direction of arrow B, see Figure 3, and against either cam 76 or 77 carried by spring barrel 78, having usual spring (not shown). The spring shaft for the barrel is indicated at 79 (see Figure 1), and this shaft is surrounded by a sleeve 80 which is attached to and rotates with the spring barrel. To this sleeve is adjustably attached a crank arm 81 having a crank pin 82, the arm being split as shown and having a clamp screw 83. The pin 82 operates between adjustable brackets 84—85 (see Figures 1 and 7) of the thermostat-adjusting plate 86 and alternately engages and moves them by a wiping action. The crank arm can be angularly adjusted to bring the crank pin 82 into proper relation with the elements 84—85. The drum 78 carries a gear 90, see Figure 3, which meshes with pinion 91 of shaft 92, which shaft also carries gear 93 meshing with pinion 94 of shaft 95, upon which shaft is fixed an escapement wheel 96. An escapement lever 97 cooperates in the usual manner with the wheel 96. Lever 97 is normally held against movement by means of one free end of a spring arm 98, suitably secured as at 100 by its opposite end to plate 2. The spring arm has an up-turned detent portion 101 related to the terminal portion of the escapement lever as shown.

The spring action of the arm 98 is in direction of the arrow D. Attached to and spaced from the spring arm 98 is a second spring arm 102, which normally engages the upper outer end of the lever 73, when the lever is positioned, as shown in Figures 2 and 3, on top of either cam 76 or 77. This lever, therefore, acts initially to hold the detent 101 in latching position to prevent escapement action, and therefore drum and crank rotation. Referring to Figure 1, it will be noted that the extension 67 of the trip lever 68 passes through a slot in the plate 5, and is disposed in opposition to and is adapted to cooperate with the teeth of disk 42. The trip lever is adapted to perform its control function if it is allowed to return substantially to the position shown in Figures 1 and 2, after having been moved outwardly from this position by either arm 65 or 66. It will be noted that the extension 67 when in initial position, lies between two teeth 48.

By referring to Figure 1: The trip hands are so related to the trip lever, that the lever is released to return to this initial position exactly on the hour for which the arm has been set in relation to the dial. The trip arms 65—66 have exactly the same shape, and it will be noted that the pointer 103 and the trip 104 of each are substantially aligned radially with reference to the axis of rotation of the dial. After the curved portion of the tripping hand engages the lever, the lever is gradually moved outwardly or in a direction away from the dial and disk, and during this movement, the trip extension 67 is pushed beyond the rotative path of the teeth 48 so that the disk 42 is caused to rotate with the dial and move the corresponding tooth in clockwise direction beyond the motion path of the extension, so that when the lever is released, this tooth will not interfere with the movement of the extension toward the disk.

Returning to the tripping operation (controlled by lever 68) the end of the projection 72 moving in direction of arrow C pushes the arm 73 in direction of arrow A off of cam 76 (or 77) and before the arm is thus pushed off, the upper surface of projection 72 engages the element 102 so that 101 continues to be held in latching position after arm 73 moves off the cam to the position shown in Figure 4, and until trip lever extension 67 moves toward the dial 40 and week-end shut-off disk 42, after release by either arm 65 or 66. Actual release, therefore, only takes place after the trip lever has reached substantially its initial position shown in Figure 1. As the drum rotates in direction of the arrow shown in Figure 4, the arm 73, under the action of the spring 75, is moved into the path of the cam and against the tip of the trip lever extension 72, which tip acts as a stop to hold the arm in the rotative plane of the approaching cam. Since the cams lie in the same rotative plane, as either cam approaches the position previously occupied by the other, the arm 73 is again raised to the position shown in Figure 3 and engages the arm 102 and moves the spring arm 98 in direction opposite to that of the arrow D, to again position the detent 101 to arrest escapement motion, and, therefore, stop the motor and motion of crank arm 81. Thus 73 acts through 102 to hold 101 in latching position. In this instance, the drum is given a step-by-step motion. Each step includes a rotation of 180°, every time that one of the arm 65 or 66 moves arm trip lever extension 67 outwardly and releases it, if no filled-in spaces 51 or 45, or their equivalents, interfere with this return motion. During every motion of the arm 81, the pin 82 engages one of the plates 84 or 85 and correspondingly moves the adjusting plate 86, see Figure 7. This plate moves about a pivotal center, not shown, to bring the two contacts 105 (both of which are mounted on plate 86 but only one of which is shown) nearer to or farther from the corresponding thermostatically controlled elements 106—107. The construction of the thermostat per se is not claimed and, therefore, a more detailed description of its parts is not herein given. However, it may be said that the elements 84—85 are each mounted on separate plates, the plates being respectively indicated at 108—109 and these plates are adjustable about a common axis 110 so that the spacing of their abutments 84 and 85 may be changed. Each plate is provided with a pointer and these pointers operate over common dial markings.

An important feature of this invention relates to the means by which the return of the trip lever extension 67 to initial position is allowed or prevented at will, and by means of which return of the trip lever to its tripping position can be prevented over various periods of time, and by means of which these times may be adjustably extended by the use of another disk or of other disks, placed against and adjustable with respect to the toothed disk 42, called the "week-end shut-off disk".

*Operation*

Figure 1 shows the position of the parts (pin 82, trip lever extension 67, and dial arm 66) just after release of the trip lever extension 67 at 6 a. m. Saturday after a "day temperature" setting of the thermostat has been made. The clock-driven dial 40 now continues to rotate in clockwise direction.

At 6 p. m. Saturday, the next succeeding tooth 48ª will have assumed a position at the left of trip lever extension 67, but the dial arm 65 will have taken the position now occupied by the arm 66, and a "night temperature" setting will have been made as the result of action of 82 on 84, and the crank 81 and pin 82 will now be positioned as shown in Figure 5. During this interval from 6 a. m. until 6 p. m. Saturday, the tooth 48ª will have engaged the trip lever as a stop to prevent motion of the shut-off disk, and will then have been released to finally assume the position mentioned.

At 6 a. m. Sunday, the parts will have assumed the position shown in Figure 5, in which position tooth 48ᵇ has assumed the position shown and extension 67 has engaged the first filled-in portion 51 of the week-end shut-off disk, and has not, therefore, moved sufficiently to perform its tripping function and, therefore, crank arm 81 has remained positioned as in Figure 5, and the thermostat has remained at the "night temperature" setting. This "night temperature" setting has thus far been maintained for twelve hours.

The dial continues to rotate and the shut-off disk is held against rotation by tooth 48ᶜ, until 6 P. M. Sunday evening, at which time the trip lever is again moved outwardly and again released to fall against the second filled-in portion 51, see Figure 6.

The shut-off dial is held against motion by tooth 48ᵈ until 6 A. M. Monday morning, at which time the arm 66 engages and releases the trip arm extension 67 and this time the extension moves to tripping position between an unfilled tooth space 49ª. The result is movement of the crank 81 from the position shown in Figure 6 to that shown in Figure 1, and engagement of pin 82 with plate 85, and consequent accomplishment of a day temperature setting of the thermostat, following a night temperature setting period of thirty-six hours.

Figure 9:
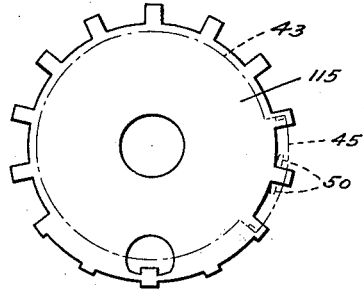
Figure 9 is a view of a modified form of shut-off disk.
Figure 10:
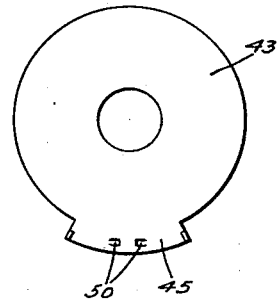
Figure 10 is a face view of the holiday shut-off disk.

In Figure 9 there has been illustrated another form of disk 115 which may be substituted for disk 42, and by means of which a particular setting may be maintained for sixty hours.

Figure 13:
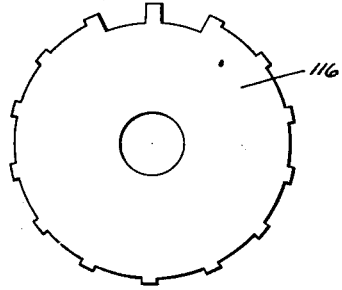
Figure 13 is a face view of a modified form of shut-off disk in which all the tooth spaces are filled in except two.
Figure 11:
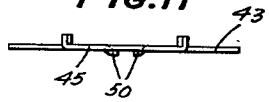
Figure 11 is an edge view of Figure 10.

Another type of substitute disk 116 is illustrated in Figure 13, in which all the tooth spaces are filled in with the exception of two. This disk can be used where it is only desired that heat be furnished for a few hours, or for a day, and is adapted for use for churches or lodge halls.

The disk 43 may be called a holiday disk, and can be used in conjunction with the other disks to prolong the setting. When used in conjunction with the disk 42, four filled spaces may be provided instead of two; or this disk 43 may be placed as in Figure 8, corresponding to a mid-week holiday period. Various combinations of the disks can be made to shorten or lengthen the periods between settings.

I claim as my invention:

1. A member and means adapting it for control action as the result of a predetermined degree of motion, a shaft, a disk having a slip friction connection with the shaft and having teeth between some of which said control member can move and of different depths to respectively permit and prevent sufficient movement of said member for control action, and means also connected to the shaft for operating the control member.

2. A member and means adapting it for control action as the result of a predetermined degree of motion, a shaft having thereon a disk having teeth between some of which said control member can move and of different depths to respectively permit and prevent sufficient movement of said member for control action, means on said shaft for moving said control member from between the teeth, and means establishing a yieldable friction connection between the shaft and said disk.

3. A mechanism to be controlled, means for controlling the mechanism, including a member which is adapted to initiate operation of the mechanism on return to a predetermined initial position after movement away from that position, means for engaging said member to move it from its initial position and to release it for return thereto, means having spaced projections between which said member is adapted to move, the depth of the projections being such as to permit movement of the member to the initial position, and means filling the spaces between some of the projections, to prevent sufficient return motion of said member to initiate operation of the mechanism.

4. A mechanism to be controlled, means for controlling the mechanism including a member which is adapted to initiate operation of the mechanism on return to a predetermined initial position after movement away from that position, means for engaging said member to move it from its initial position and to release it for return thereto, means having spaced projections between which said member is adapted to move, the depth of the projections being such as to permit movement of the member to the initial position, and means detachably secured to said last mentioned means and filling the spaces between some of the projections to prevent sufficient return motion of said member to initiate operation of the mechanism.

5. A shaft, a trip arm movable by the shaft, means rotatable about the shaft and having spaced projections and means by which the last mentioned means normally moves with the shaft but is capable of moving independently of it, a control member adapted to move automatically between the projections to prevent motion of the first mentioned means, while shaft and arm motion continue, said arm being adapted to move said member to projection-release position, and to release the member only when the corresponding projection is no longer in opposition to it, and means for reducing the depth of the spaces between certain of the projections to limit the degree of motion of the control member.

6. A clock, and a shaft operable thereby, a dial movable with the shaft and having graduations, trip arms adjustable on the shaft with respect to the graduations, and means for securing the arms for rotation with the shaft after adjustment, control mechanism and means for controlling operation thereof including a member adapted to be engaged and then released by each arm, and adapted after a certain degree of motion following release to initiate control mechanism operation, a disk having a yieldable friction driving connection with said shaft and having teeth adapted to consecutively engage said trip as a stop to arrest disk motion while arm and dial motion continue, the depth of certain of the teeth being such as to allow sufficient motion of the member to initiate control mechanism operation, and a means filling the space between some of the teeth to prevent sufficient return motion of said member to initiate control mechanism operation.

7. A shaft and means for driving it, a trip arm on the shaft, control mechanism and means for controlling operation thereof including a member adapted to be engaged and then released by the arm and adapted after a certain degree of motion following release to initiate control mechanism operation, means having a yieldable friction driving connection with said shaft and having teeth adapted to consecutively engage said member as a stop to arrest motion of the disk while arm and shaft motion continue, the direction of motion of the member after release being toward the teeth, the depth of certain of the teeth being such as to allow a sufficient motion of the trip to initiate control mechanism operation, and the depth of certain other teeth being such as to prevent such motion.

8. An auxiliary trip control for use with a trip mechanism comprising a trip lever which must move from a first position to a second position and return to its first position to obtain a tripping action, a trip arm for periodically moving said trip lever from its first position to its second position and for then releasing the trip lever for return to its first position, a constantly rotating shaft for driving said trip arm, a member carried on the shaft and movable to a position to intercept return movement of said trip lever from its second position to its first position, and means operable by the constantly driven shaft for moving said member to its intercepting position at predetermined times.

9. A device of the class described comprising a normally stationary shaft, means for driving the shaft, means for controlling the driving means including a trip lever which when moved away and then returned to an initial position obtains operation of the shaft by said driving means, a trip arm for moving the lever away from its initial position and then releasing it for return thereto, a constantly rotating shaft operating said trip arm for causing the same to periodically move and release the trip lever, and means carried and driven intermittently by the constantly rotating shaft for preventing return motion of the lever to its initial position after predetermined movements thereof from its original position by said trip arm.

10. In a device of the class described, a timing mechanism, power driven means, a control member for said power driven means and means by which it initiates operation of said last mentioned means after return to an initial position following movement away from such position, means controlled by the timing mechanism for moving said control member away from initial position and thereafter releasing it for return thereto, and means driven intermittently by said timing mechanism for permitting or preventing return of said element to its initial position, after release.

11. A device of the class described having a driven shaft and a clock for timing it, a member having spaced projections and having a slip friction rotating connection with the shaft, a mechanism to be controlled, means including a control member for controlling said mechanism, said member normally lying in the path of said projections to be engaged thereby as a stop, and which is adapted to operate the mechanism on a return to normal position after movement out of the path of said projections, and means for causing the control member to be moved from the path and released for return in it.

12. A driven shaft, a toothed disk having a slip-friction rotating connection with the shaft, a mechanism to be controlled, means for controlling the mechanism including a member which normally lies in the path of the teeth and which is adapted to obtain operation of the mechanism on return to that position after movement out of the path of the teeth, and means carried by the shaft for engaging said control member to move it from its initial position and to release it for return thereto.

13. A driven shaft, a toothed disk having a slip-friction rotating connection with the shaft, a mechanism to be controlled, means for controlling the mechanism including a member which normally lies in the path of the teeth and which is adapted to initiate operation of the mechanism on return to that position after movement out of the path of the teeth, means carried by the shaft for engaging said control member to move it from its initial position and to release it for return thereto, and means attached to said disk to prevent return of said member to the initial position.

14. A driven shaft, a first toothed disk having a slip-friction rotating connection with the shaft, a mechanism to be controlled, means for controlling the mechanism including a member which normally lies in the path of the teeth and which is adapted to initiate operation of the mechanism on return to that position after movement out of the path of the teeth, means carried by the shaft for engaging said member to move it from its initial position and to release it for return thereto and a second disk rotatable on said shaft and attached to said first disk in any one of a number of positions to prevent return of said member to the initial position.

15. In a device of the class described, a timing mechanism including a shaft which makes a complete rotation every twenty-four hours, an hour-graduated dial disk, a mechanism to be controlled, means for controlling the mechanism including a member which is adapted to initiate operation of the mechanism on return to abutting engagement with the edge of the dial disk after a movement away from that position, a toothed disk on said shaft between the teeth of which said control member moves to engage the edge of the first disk, and means for reducing the depth of the spaces between certain of said teeth to limit the degree of motion of said control member and to prevent operation of the mechanism, said last mentioned disk having a slip-friction rotating connection with the shaft, whereby on engagement of one of the teeth with said member the disk can remain stationary while the shaft moves, and means on the shaft for moving said member from its initial position and release it for return thereto.

16. A driven shaft, a toothed disk having a slip-friction rotating connection with the shaft, a mechanism to be controlled, means for controlling the mechanism including a member which is adapted to obtain operation of the mechanism after movement from an initial position which is in the path of the teeth to a position out of the path and return to the initial position, means carried by the shaft for engaging the member to move it from its initial position and release it for return thereto, the teeth of said disk being adapted to successively engage said member as a stop for holding the disk stationary while said control member-engaging means operates the control member.

17. A mechanism to be controlled, means including a member for controlling said mechanism, means driven at a constant speed for engaging said member to move it from an initial position and release it for return thereto to perform a control function, and means driven intermittently by said last mentioned means to prevent at predetermined times sufficient return movement of said member whereby the control function is not performed.

18. A mechanism to be controlled, means including a member for controlling said mechanism, a power driven shaft, means carried by said shaft to move said member from a normal position and release it for return thereto whereby a control function is completed, other means carried and driven intermittently by said shaft normally permitting return movement of said member but adapted at spaced intervals to prevent return movement of said member whereby the control function is not completed.

19. A shaft, a trip arm movable by the shaft, means rotatable about the shaft and having spaced projections and means by which the last mentioned means normally moves with the shaft but is capable of moving independently of it, a control member between the projections to prevent motion of the first mentioned means while shaft and arm motion continues, said arm being adapted to move said member to projection-release position, and to release the member only when the corresponding projection is no longer in oppsition to the member.

20. A member and means adapting it to perform a control function on return to a predetermined initial position after movement away from that position, a shaft having means for engaging said member to move it from its initial position and release it for return thereto, and means on said shaft and driven intermittently thereby to permit and prevent at predetermined times sufficient return motion of said member to perform its control function.

ANDREW G. McNICOLL.